Patented Aug. 4, 1953

2,647,843

UNITED STATES PATENT OFFICE 2,647,843

ADHESIVE TAPE

Cyrus W. Bemmels, New Brunswick, N. J., assignor to Permacel Tape Corporation, a corporation of New Jersey No Drawing. Application March 29, 1950, Serial No. 152,760

10 Claims. (Cl. 117—76)

This invention relates to adhesive coated flexible sheets and more particularly to normally tacky and pressure-sensitive adhesive sheets having nonfibrous, nonmetallic, impervious hydrophobic organic film backings selected from the groups consisting of cellulose esters, vinyl and vinylidene halide polymers and copolymers, polyesters, and superpolyamides of the nylon type. Normally tacky and pressure-sensitive adhesive sheets based on nofibrous, nonmetallic, impervious film materials are widely known and have received considerable commercial development. The best known backing for such adhesive tapes is cellophane, which has certain outstanding properties such as toughness and availability at relatively low cost, but which has other substantial disadvantages such as lack of moisture resistance, tendency to brittleness in dry climates, poor electrical properties and only mediocre tensile strength. Efforts were made in the past to provide normally tacky and pressure-sensitive adhesive tapes based on films other than cellophane in order to provide adhesive tapes that could be used in cases where the above mentioned disadvantages make the use of normally tacky and pressure-sensitive cellophane tape inadvisable or impossible. Most desirable film backings of this type, however, are difficult to join permanently and securely to the normally tacky and pressure-sensitive adhesive liners and cannot be anchored to this layer by means of intermediate so-called primers or subbing coats that were developed particularly for use in normally tacky and pressure-sensitive adhesive film tapes based on cellophane. The recent substantial development of films other than cellophane and their use in many applications, particularly in packaging, masking, decorative work and in many other applications, increased the urgent need for satisfactory adhesive tapes based upon these materials.

Broadly stated, the object of the invention is to provide a firm, nonweakening bond between the film backing and the adhesive coat of an adhesive product. More particularly, an object is to prepare normally tacky and pressure-sensitive adhesive sheets wherein there are such bonds. Another object of the invention is the provision of compositions adapted to bond normally tacky and pressure-sensitive adhesive compositions to various films. A further object is the provision of normally tacky and pressure-sensitive adhesive sheets that are free of objections against similar products of the prior art. Yet other objects of the invention are the provision of satisfactory normally tacky and pressure-sensitive adhesive sheets that conform readily to surfaces to which they are applied, that are thin, have high strength and low moisture permeability and sensitivity, good electrical properties and that show little if any change at great humidities or under conditions of dry heat.

In accordance with the invention a normally tacky and pressure-sensitive adhesive sheet is prepared by first coating a flexible sheet, having nonfibrous, nonmetallic, impervious hydrophobic organic film backings selected from the groups consisting of cellulose esters, vinyl and vinylidene halide polymers and copolymers thereof, polyesters and superpolyamides of the nylon type with a thin layer of a primer composition based on polymers comprising from twenty to eighty per cent of the polymer weight of a copolymer comprising from fifteen to forty-five per cent acrylonitrile and from fifty-five to eighty-five per cent of a conjugated diene, the remaining polymers in the composition being predominantly at least one diene polymer selected from the group consisting of natural rubber and the copolymers of conjugated diene and styrene. A normally tacky and pressure-sensitive adhesive coating is then applied over the above-mentioned primer coating to form the complete adhesive sheet. A satisfactory normally tacky and pressure-sensitive adhesive sheet results wherein the adhesive is secured firmly to its film backing and wherein there is no separation of the several layers even after long storage or during repeated use under adverse conditions.

While various types of films may be used within the limits of the invention, the preferred films on which the primers perform best are cellulose acetate, its copolymers such as cellulose acetate propionate and cellulose acetate butyrate; other cellulose esters, such as cellulose propionate, cellulose butyrate and cellulose propionate butyrate, cellulose nitrate, vinyl halide polymers and particularly the copolymers of major proportions of vinyl chloride with vinyl acetate, vinylidene chloride, and/or maleic anhydride; vinylidene chloride polymers and particularly the copolymers of major proportions of vinylidene chloride with vinyl chloride, vinyl acetate, acrylonitrile and/or maleic anhydride (the fluorides and bromides may be substituted for the chlorides in all the above-mentioned polymers with closely similar results as far as this invention is concerned); nylon; polyester films such as the grade of polyester film known as V 101 and in general the cross-linked polyester condensation product of dibasic acids such as maleic, fumaric, itaconic, phthalic and adipic acid, with glycols such as ethylene glycol; diethylene glycol, and propylene glycol, and with unsaturated compounds such as styrene and conjugated dienes; and plasticized films of these types.

In the preferred embodiments of the invention the primer layer comprises a weight of from one hundredth of one ounce to one-half ounce per square yard, and the normally tacky and pressure-sensitive adhesive is applied to a spreading weight of about seven tenths to about four ounces per square yard. While application of the layers by means of heat is possible using, for instance, a hot melt coater, the usual method of application comprises spreading from solvent at or about normal room temperature and drying the coating at elevated room temperatures, for instance, at from one hundred and fifty degrees Fahrenheit to three hundred degrees Fahrenheit for from half a minute to three minutes.

In order to disclose the nature of the invention more clearly, preferred embodiments thereof will be described now in considerable detail. It should be understood, however, that this is done by way of example only, and solely for the purpose of illustrating by means of specific examples, the basic principles which are applicable broadly to all embodiments contemplated in the invention, i. e., the invention is not restricted to the specific examples described hereinafter. In these examples all figures not otherwise marked refer to parts by weight.

EXAMPLE I

In accordance with a preferred embodiment of the invention a two mil film of cellulose acetate is solvent coated by means of a kiss coater to a coating weight of 0.1 ounce per square yard, using as a primer a composition comprising:

| | |
|---|---|
| A high molecular weight copolymer of 25 per cent by weight acrylonitrile and 75 per cent by weight butadiene | 5 |
| Copolymer of equal parts of styrene and butadiene having a Mooney viscosity of 50 | 5 |
| Toluene solvent | 45 |
| Acetone | 45 |

After drying of the primer coat for one minute at one hundred eighty degrees Fahrenheit the following normally tacky and pressure-sensitive adhesive composition was applied by means of a reverse roll coater to a coating weight of one ounce per square yard:

| | |
|---|---|
| Copolymers comprising 75 parts by weight butadiene and 25 parts styrene, Mooney viscosity 90 | 12 |
| Hydrogenated rosin, melting point 83° C. | 8 |
| Acetone-aniline condensation product | 0.2 |
| Normal heptane solvent | 79.8 |

The second coating was dried for three minutes at a temperature of one hundred and seventy degrees Fahrenheit. A test of the adhesive tape showed a force of forty-three ounces per square inch of width to be necessary to remove the adhesive from the backing while a corresponding unprimed sheet required a removal force of only twenty ounces per square inch.

The following table illustrates typical further examples of the invention using one-tenth of one ounce per square yard of various preferred primer compositions and a coat of one ounce per square yard of the following normally tacky and pressure-sensitive adhesive composition:

| | |
|---|---|
| Pale crepe natural rubber | 100 |
| Polybeta pinene, melting point 115° C. | 30 |
| Hydrogenated rosin | 30 |
| Polybeta napthyl amine antioxidant | 1 |

TABLE I

| Example | Parts By Weight in Solution Or Dispersion | | | | | | | | | | | | | | For Comparison (Incomplete Primers) | | |
|---|---|---|---|---|---|---|---|---|---|---|---|---|---|---|---|---|---|
| | II | III | IV | V | VI | VII | VIII | IX | X | XI | XII | XIII | XIV | XV* | | | |
| Copolymer of 25% Acrylonitrile and 75% Butadiene | 5 | 5 | 8 | 2 | 5 | | | 5 | | | | | | | 10 | | |
| Copolymer of 40% Acrylonitrile and 60% Butadiene | | | | | | 5 | 3 | | | | | | | 20 | | | |
| Copolymer of 18% Acrylonitrile and 82% Butadiene | | | | | | | | 7 | | 5 | 4 | 3 | 2 | | | | 10 |
| Copolymer of 50% Butadiene and 50% Styrene, Mooney Value 50 | 5 | 5 | 2 | 8 | | 5 | 7 | 3 | 5 | 5 | 6 | 7 | 8 | | | 10 | |
| Pale Crepe Natural Rubber | | | | | 5 | | | | | | | | | 79 | | | |
| Toluene Solvent | 45 | 90 | 45 | 45 | 65 | 45 | 45 | 45 | 45 | 45 | 45 | 45 | 45 | | 45 | 45 | 45 |
| Acetone Solvent | 45 | | 45 | 45 | 25 | 45 | 45 | 45 | | 45 | 45 | 45 | 45 | | 45 | 45 | 45 |
| Propylene Oxide Solvent | | | | | | | | | 45 | | | | | | | | |
| Potassium Rosinate Dispersing Agent | | | | | | | | | | | | | | 1 | | | |
| Adhesion between Adhesive And Film Backing (oz./inch): | | | | | | | | | | | | | | | | | |
| With Primer | 43 | 41 | 27 | 33 | 48 | 46 | 37 | 34.5 | 35 | 45 | 45 | 38.5 | 26.5 | 38 | 16.5 | 25.5 | 18.5 |
| Without Primer | | | | | | | | | 19.5 | | | | | | | | |

* Aqueous dispersion using latices of the polymers listed; weights are on dry solids basis.

The adhesive compositions are equally useful on the other films of the invention. Accordingly, the following table shows the use of the primer of Example I using various films comparing the adhesion between adhesive and backing of the primed product with the corresponding adhesion of the unprimed product. The adhesive of Example II was used in the examples of the following table:

TABLE II

| Example No. | Film | Adhesion of Normally Tacky and Pressure Sensitive Adhesive to Film (Ounces Per Inch) | |
|---|---|---|---|
| | | Without Primer | With Primer of Invention |
| XVI | Cellulose Acetate | 19.5 | 43 |
| XVII | Cellulose Acetate Butyrate | 14.5 | 34.5 |
| XVIII | Saran | 23 | 28 |
| XIX | Nylon | 16.5 | 45.5 |
| XX | Vinyl Chloride Acetate Plasticized with Thirty Percent Polyethylene Glycol Sebacate | 18.5 | 30.0 |
| XXI | Polyester V-101 | 22.5 | 60.0 |

The following additional normally tacky and pressure-sensitive adhesives are typical of the many other adhesives that perform to satisfaction in the execution of the invention.

EXAMPLE XXII

| | |
|---|---|
| Polyvinyl ethyl ether (Intrinsic viscosity 2.37) | 20 |
| Hydrogenated rosin | 1 |
| Phenyl alpha naphthyl amine antioxidant | .07 |
| Toluene | 79 |

EXAMPLE XXIII

| | |
|---|---|
| Smoked sheet natural rubber | 10 |
| Zinc oxide | 8 |
| Hydrogenated coumarone-indene resin | 8 |
| Lanolin | 3 |
| Alkylated polyhydroxy phenol as age resistor | 0.3 |
| Toluene | 70.7 |

EXAMPLE XXIV

*The adhesive of Example I*

Satisfactory adhesive sheets were obtained using backings, primers and adhesives in accordance with the following Table 3. The primed sheets in each case showed substantially better adhesion between the adhesive and film backing than the unprimed sheets.

TABLE III

| Film | Thickness (Mils) | Primer | Weight (Oz./Sq. Yd.) | Adhesive | Weight (Oz./Sq. Yd.) |
|---|---|---|---|---|---|
| Cellulose Acetate | 1.5 | Example X | 0.01 | Example XXII | 0.9 |
| Do | 2 | Example VI | 0.05 | Example XXIII | 0.75 |
| Polyester V-101, Cross-Linked | 1 | Example VIII | 0.1 | Example XXIII | 1.35 |
| Nylon | 1.5 | Example II | 0.1 | Example XXIV | 1.0 |
| Saran | 2 | Example X | 0.15 | Example XXIV | 1.25 |
| Vinyl Chloride Acetate Film Plasticized with Thirty Percent, Polyethylene Glycol Sebacate. | 9 | Example VII | 0.25 | Example XXIII | 2.00 |

The preparation of the adhesives forms no part of this invention and it has been noted that any pressure-sensitive adhesive primed in the manner of this invention provide satisfactory normally tacky and pressure-sensitive adhesive tapes. Normally tacky and pressure-sensitive adhesive tapes are those which need no activation by heat or solvent but which adhere by mere pressure, and such compositions are well-known in the art and are described in the patent and other literature. Pressure-sensitive adhesives based on conjugated diene polymers such as butadiene copolymers and natural rubber or vinyl ether adhesives are preferred. The term conjugated diene throughout this specification is intended to include among others particularly butadiene, isoprene, pentadiene and methylpentadiene and those polymers may be substituted for butadiene wherever mention is made herein of butadiene. Wherever in this specification various materials are listed for use as components in the compositions thereof, one may be substituted for the other with similar results or combinations may be used to provide the total weight required of the component.

Many other variations of the above-described invention are apparent to those skilled in the art and are included in the spirit of the invention.

I claim:

1. Adhesive tape comprising a nonfibrous, nonmetallic, impervious hydrophobic organic cellulose acetate film backing; a normally tacky and pressure-sensitive adhesive coating based on a polymer selected from the group consisting of conjugated diene polymers, and vinyl ether polymers and their copolymers, and, therebetween, a primer coating in film form comprising a thin layer of a composition comprising polymeric constituents, including from about twenty to about eighty per cent of the polymer weight of a copolymer comprising from about fifteen to about forty-five per cent of its weight acrylonitrile and from about fifty-five to about eighty-five per cent of at least one butadiene, the remainder of the polymer part of said primer being predominantly at least one copolymer of major portions of butadiene and styrene.

2. Adhesive tape comprising a nonfibrous, nonmetallic, impervious hydrophobic organic cellulose acetate film backing; a normally tacky and pressure-sensitive adhesive coating based on a polymer selected from the group consisting of conjugated diene polymers, and vinyl ether polymers and their copolymers, and, therebetween, a primer coating in film form comprising a thin layer of a composition comprising polymeric constituents, including from about twenty to about eighty per cent of the polymer weight of a copolymer comprising from about fifteen to about forty-five per cent of its weight acrylonitrile and from about fifty-five to about eighty-five per cent of at least one butadiene, the remainder of the polymer part of said primer being predominantly at least one conjugated diene polymer selected from the group consisting of natural rubber and the copolymers of conjugated diene and styrene.

3. Adhesive tape comprising a nonfibrous, nonmetallic, impervious hydrophobic organic cellulose acetate film backing; a normally tacky and pressure-sensitive adhesive coating based on a polymer selected from the group consisting of conjugated diene polymers, and vinyl ether polymers and their copolymers, and, therebetween, a primer coating in film form comprising a thin layer of a composition comprising polymeric constituents, including substantially equal parts of the polymer weight of a copolymer comprising from about fifteen to about forty-five per cent of its weight acrylonitrile and from about fifty-five to about eighty-five per cent of at least one conjugated diene, the remainder of the polymer part of said primer being predominantly at least one conjugated diene polymer selected from the group consisting of natural rubber and the copolymers of conjugated diene and styrene.

4. Adhesive tape comprising a nonfibrous, nonmetallic, impervious hydrophobic organic cellulose acetate film backing; a normally tacky and pressure-sensitive adhesive coating based on a polymer selected from the group consisting of conjugated diene polymers, and vinyl ether polymers and their copolymers, and, therebetween, a primer coating in film form comprising a thin layer of a composition comprising polymeric constituents, including from about twenty to about eighty per cent of the polymer weight of a copolymer comprising from about fifteen to about forty-five per cent of its weight acrylonitrile and from about fifty-five to about eighty-five per cent of at least one butadiene, the remainder of the polymer part of said primer being predominantly rubber.

5. Adhesive tape comprising a nonfibrous, nonmetallic, impervious hydrophobic organic film backing selected from the group consisting of the cellulose esters, vinyl and vinylidene chloride polymers, cross-linked polyesters made essentially from terephthalic and ethylene glycol, and superpolyamides of the nylon type, and copolymers of these polymers; a normally tacky and pressure-sensitive adhesive coating thereon and based on and composed largely of a polymer selected from the group consisting of the conjugated diene polymers and vinyl ether polymers and their copolymers; and, therebetween, a primer coating in film form comprising a thin layer of a composition comprising polymeric constituents, including from about twenty to about eighty per cent of the polymer weight of a copolymer comprising from about fifteen to about forty-five per cent of its weight acrylonitrile and from about fifty-five to about eighty-five per cent of at least one conjugated diene, the remainder of the polymer part of said primer being predominantly rubber.

6. Adhesive tape comprising a nonfibrous, nonmetallic impervious hydrophobic organic film backing selected from the group consisting of the cellulose esters, vinyl and vinylidene chloride polymers, cross-linked polyesters made essentially from terephthalic and ethylene glycol, and superpolyamides of the nylon type, and copolymers of these polymers; a normally tacky and pressure-sensitive adhesive coating based on a polymer selected from the group consisting of conjugated diene polymers, and vinyl ether polymers and their copolymers, and, therebetween, a primer coating in film form comprising a thin layer of a composition comprising polymeric constituents, including from about twenty to about eighty per cent of the polymer weight of a copolymer comprising from about fifteen to about forty-five per cent of its weight acrylonitrile and from about fifty-five to about eighty-five per cent of at least one butadiene, the remainder of the polymer part of said primer being predominantly at least one butadiene styrene copolymer.

7. Adhesive tape comprising a nonfibrous, nonmetallic, impervious hydrophobic organic film backing selected from the group consisting of the the cellulose esters, vinyl and vinylidene chloride polymers, cross-linked polyesters made essentially from terephthalic and ethylene glycol, and superpolyamides of the nylon type, and copolymers of these polymers; a normally tacky and pressure-sensitive adhesive coating thereon based upon a rubbery elastomeric constituent as the cohesive agent and selected from the group consisting of the conjugated diene polymers and vinyl ether polymers and their copolymers; and, therebetween, a primer coating in film form comprising a thin layer of a composition comprising polymeric constituents, including from about twenty to about eighty per cent of the polymer weight of a copolymer comprising from about fifteen to about forty-five per cent of its weight acrylonitrile and from about fifty-five to about eighty-five per cent of at least one butadiene, the remainder of the polymer part of said primer being predominantly at least one conjugated diene polymer selected from the group consisting of natural rubber and the copolymers of conjugated diene and styrene.

8. Adhesive tape comprising a nonfibrous, nonmetallic, impervious hydrophobic organic cellulose acetate film backing; a normally tacky and pressure-sensitive adhesive coating based on a polymer selected from the group consisting of conjugated diene polymers, and vinyl ether polymers and their copolymers, and, therebetween, a primer coating in film form comprising a thin layer of a composition comprising polymeric constituents, including from about twenty to about eighty per cent of the polymer weight of a copolymer comprising from about fifteen to about forty-five per cent of its weight acrylonitrile and from about fifty-five to about eighty-five per cent of at least one conjugated diene, the remainder of the polymer part of said primer being predominantly at least one conjugated diene polymer selected from the group consisting of natural rubber and the copolymers of conjugated diene and styrene.

9. Adhesive tape comprising a nonfibrous, nonmetallic impervious hydrophobic organic film backing selected from the group consisting of the cellulose esters, vinyl and vinylidene chloride polymers, cross-linked polyesters made essentially from terephthalic and ethylene glycol, and superpolyamides of the nylon type, and copolymers of these polymers; a normally tacky and pressure-sensitive adhesive coating based on a polymer selected from the group consisting of conjugated diene polymers, and vinyl ether polymers and their copolymers, and, therebetween, a primer coating in film form comprising a thin layer of a composition comprising polymeric constituents, including from about twenty to about eighty per cent of the polymer weight of a copolymer comprising from about fifteen to about forty-five per cent of its weight acrylonitrile and from about fifty-five to about eighty-five per cent of at least one conjugated diene, the remainder of the polymer part of said primer being predominantly at least one conjugated diene polymer selected from the group consisting of natural rubber and the copolymers of conjugated diene and styrene.

10. Adhesive tape comprising a nonfibrous, nonmetallic, impervious hydrophobic organic film backing selected from the group consisting of the cellulose esters, vinyl and vinylidene chloride polymers, cross-linked polyesters made essentially from terephthalic and ethylene glycol, and superpolyamides of the nylon type, and copolymers of these polymers; a normally tacky and pressure-sensitive adhesive coating thereon based upon a rubbery elastomeric constituent as the cohesive agent; and, therebetween, a primer coating in film form comprising a thin layer of a composition comprising polymeric constituents, including from about twenty to about eighty per cent of the polymer weight of a copolymer comprising from about fifteen to about forty-five per cent of its weight acrylonitrile and from about fifty-five to about eighty-five per cent of at least one conjugated diene, the remainder of the polymer part of said primer being predominantly at least one conjugated diene polymer selected from the group consisting of natural rubber and the copolymers of conjugated diene and styrene.

CYRUS W. BEMMELS.

References Cited in the file of this patent

UNITED STATES PATENTS

| Number | Name | Date |
|---|---|---|
| 2,273,880 | Mitchell | Feb. 24, 1942 |
| 2,458,166 | Homeyer | Jan. 4, 1949 |
| 2,459,874 | Fay | Jan. 25, 1949 |
| 2,487,060 | Pike et al. | Nov. 8, 1949 |
| 2,491,477 | Chmiel | Dec. 20, 1949 |
| 2,499,724 | Compton | Mar. 7, 1950 |
| 2,576,148 | Schectman | Nov. 27, 1951 |